June 7, 1932.　　　G. I. JONES ET AL　　　1,861,923
BLOWPIPE APPARATUS AND METHOD OF CUTTING METAL
Filed Feb. 3, 1930　　2 Sheets-Sheet 1
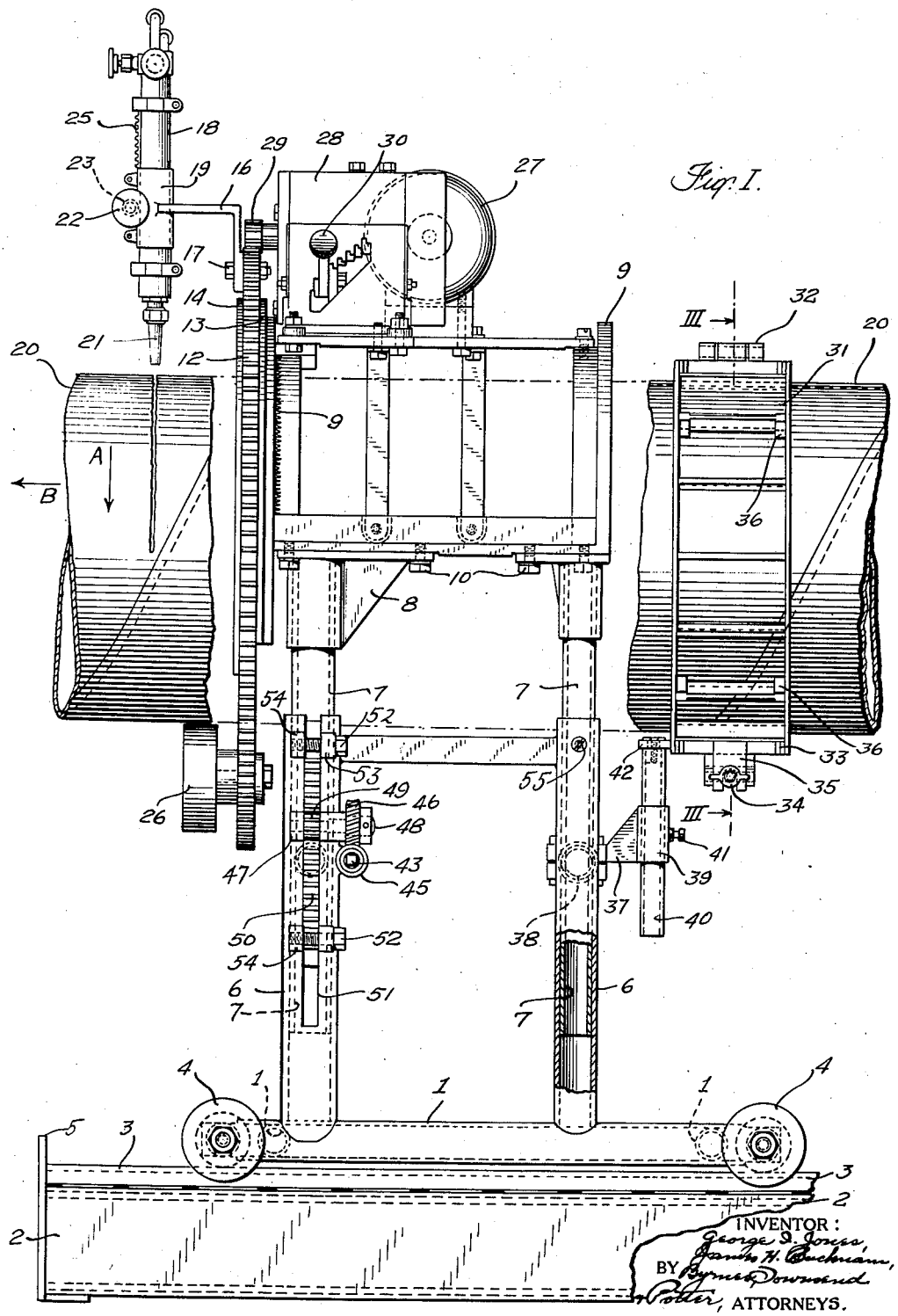

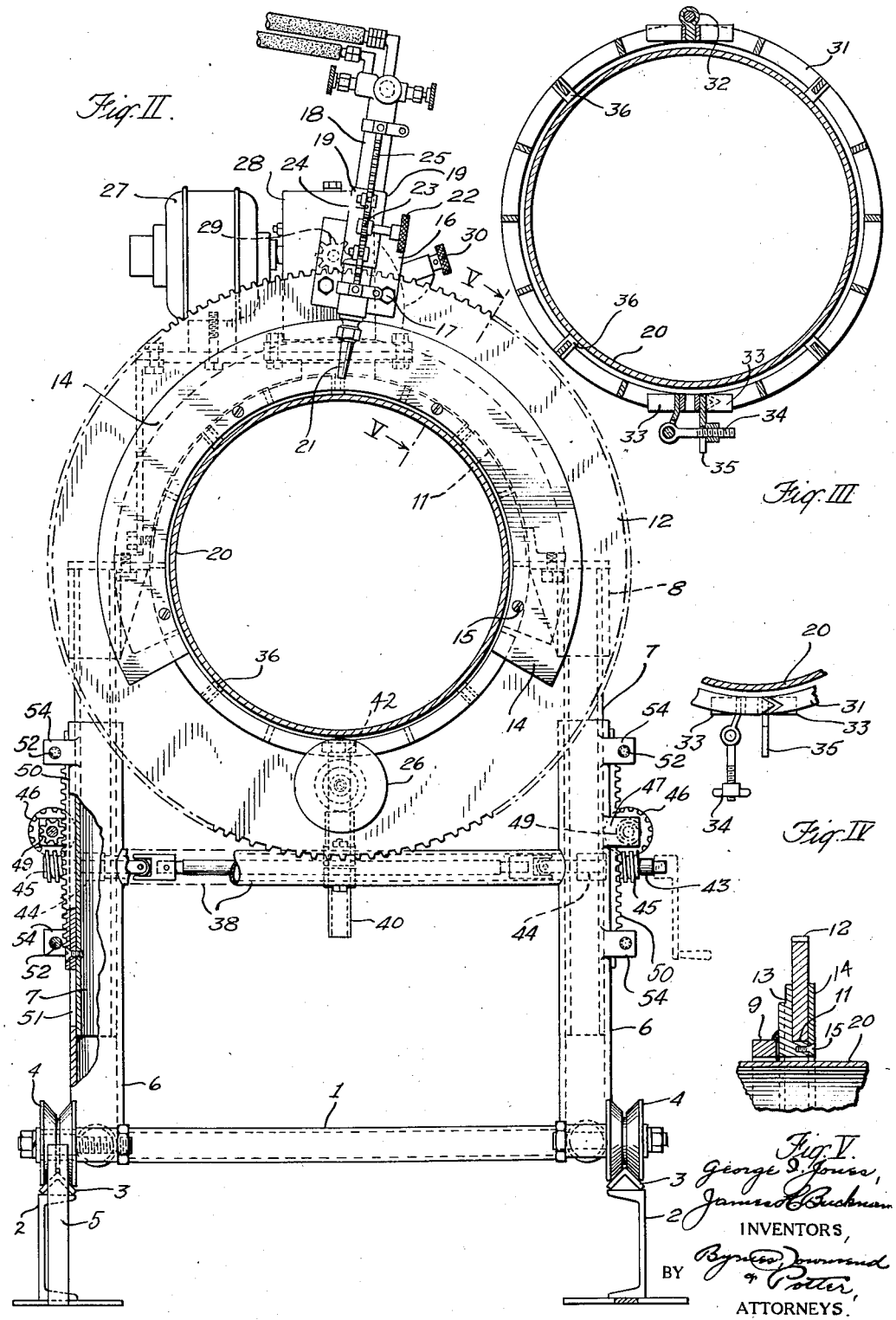

Patented June 7, 1932

1,861,923

UNITED STATES PATENT OFFICE

GEORGE I. JONES AND JAMES H. BUCKNAM, OF BUFFALO, NEW YORK, ASSIGNORS TO THE LINDE AIR PRODUCTS COMPANY, A CORPORATION OF OHIO

BLOWPIPE APPARATUS AND METHOD OF CUTTING METAL

Application filed February 3, 1930. Serial No. 425,690.

Our invention relates to a cutting and metal welding machine comprising a mechanically driven transversely movable cutting or welding apparatus mounted on a longitudinally movable and vertically adjustable carriage. Our invention especially relates to a machine for cutting off sections of a shape of metal such as a pipe while it is advancing along its longitudinal axis.

In the manufacture of continuous lengths of shapes of metal the shape is usually discharged from the manufacturing machine progressively along a line. As a specific example in the manufacture of continuous lengths of pipe, the pipe may be made from metal sheets which are drawn over a mandrel at an angle to the axis of the mandrel and wound into a spiral so that the edges of spirals may be welded or otherwise joined together to form a pipe or a tube of indefinite length, which advances continuously from the machine and also rotates about its longitudinal axis as it is being discharged from the machine. It is desirable to cut the pipe into sections while it is being discharged from the machine, in order that the manufacture of the pipe may not be delayed while it is being cut.

In practice the pipe does not rotate at the proper speed so that it may be cut most efficiently by a cutter which may be held stationary with respect to the rotating pipe. In order to cut the pipe efficiently, it is therefore necessary to rotate the cutter around the pipe.

In some pipe manufacturing machines the height of the top of the mandrel over which the pipe is formed is constant for pipes of all sizes. Consequently, the height of the center of the pipe about which the cutter must rotate is variable for pipes of different sizes. Due to this variation, it is necessary to provide some means for adjusting the height of the center of rotation of the cutter in order to adapt the cutting machine for cutting pipes of different sizes which are manufactured by such machines. This adjustable feature is also desirable when cutting or welding other metal shapes where the longitudinal axis of such shapes may be located at variable heights.

As another example of the use of our machine it may be employed to weld longitudinal seams in metal shapes, for example, such seams as may be formed in the manufacture of pipe by rolling a sheet of metal about an axis parallel to the length of the sheet may be welded by moving the carriage carrying a blowpipe along the seam and parallel thereto.

An object of our invention is to construct a cutting and welding machine comprising a cutting or welding apparatus mounted on a longitudinally movable and vertically adjustable carriage.

Another object of our invention is to construct a machine for cutting off sections of a shape of metal while the shape is advancing along its longitudinal axis.

Another and more specific object of our invention is to provide a means for advancing a blowpipe at the same rate of speed as an advancing pipe to be operated upon, and to rotate the blowpipe about the axis of the pipe as the blowpipe is advanced.

Another object of our invention is to rotate the blowpipe at predetermined different rates of speed.

Another object of our invention is to construct a machine adapted to cut pipes of different sizes as they are discharged from a particular machine.

These and other objects of our invention will be more clearly understood from the following description and accompanying drawings showing one embodiment of our invention as applied to a pipe cutting machine in which:

Figures I and II are side and end views, respectively, of the pipe cutting machine.

Figure III is a section of the pipe clamping collar on line III—III of Figure I; and, Figure IV is a fragmentary view of the collar in elevation.

Figure V is a radical section of the front end of the machine on line V—V in Figure II.

The carriage 1 of the machine is supported on a track 2 comprising two V shaped rails 3 on which four grooved wheels 4 of the carriage are adapted to travel to and fro. A stop 5 is placed at the end of the track to prevent the wheels 4 from rolling off the end of the track. The carriage 1 is provided with four hollow standards 6 into each of which a post 7 slidably fits. Each of the upper ends of the posts 7 are provided with a bracket 8 which has a socket which fits over the end of each post. A saddle, or vertically movable frame, 9 for supporting the cutting mechanism is secured to the brackets 8 by stud bolts 10. The front end of the saddle 9 projects outwardly beyond the standards 6 and it is provided with a circular arch shaped bearing shoulder 11 having a substantially horizontal axis and upon which a ring gear 12 is rotatively mounted. The gear 12 is held on the bearing shoulder 11 between a vertical arcuated flange 13 on the saddle 9 and another similarly shaped flange 14 secured to the shoulder 11 on the opposite side of the gear 12 with screws 15 extending through the flange 14 and threaded into the shoulder 11.

A bracket 16 is secured to the side of the ring gear 12 with bolts 17. A cutting blowpipe 18 is mounted in a sleeve 19 on the bracket 16. The blowpipe is adapted to cut the pipe 20 into sections which pass underneath the saddle 9 and through the gear 12. The nozzle 21 of the blowpipe may be adjusted away from or towards the surface of the pipe 20 by a manually operated knob 22 which operates a pinion 23 journaled in a slot 24 in the sleeve 19 and which pinion meshes with a rack 25 fixed to the body of the blowpipe 18.

In order to balance the weight of the blowpipe 18, on the gear 12, a counterweight 26 is secured to the gear 12 at a point diametrically opposite the blowpipe.

A motor 27 for rotating the blowpipe is mounted on the saddle 9. The motor 27 is geared to a change speed mechanism 28 which may change the speed of the driving pinion 29 which drives the ring gear 12 to which the blowpipe 18 is attached. The change speed mechanism 28 may be of any suitable type. As herein shown, it comprises a set of gears enclosed in a box, which gears may be shifted by a manually operated lever 30 to obtain the proper rotative speed for the blowpipe 18.

The pipe 20 may rotate in either direction. For the purpose of illustrating our invention, the pipe will be described as rotating in the direction indicated by the arrow A and advancing forwardly in the direction indicated by the arrow B. Suitable means may be provided to advance the blowpipe and its supporting carriage along with the pipe during the cutting-off operation. The driving means herein provided comprises a split collar 31 having its halves pivoted together by a hinge joint 32 surrounds the pipe 20 and it is supported thereby. The open ends 33 of the collar 31 may be drawn together by the bolt and wing nut 34 pivotally mounted on one of the open ends of the split collar 31, and which cooperates with a slotted bracket 35 on the other open end of the collar. When the open ends 33 of the collar 31 are drawn together as shown in Figure III, the internally projecting lugs 36 on the collar grip the pipe and cause the collar to rotate and travel forward with the pipe. When the ends of the collar 31 are released as shown in Figure IV, the collar may be slipped along the pipe 20. A bracket 37 is secured to and extends from a cross member 38 extending between the two rear standards 6. The bracket 37 projects rearwardly from the carriage 1. The end of the bracket is provided with a socket 39 into which an upright post 40 fits. The post 40 may be adjusted in a vertical plane and it is secured in the socket by a set screw 41 threaded into the socket 39. The upper end of the post 40 carries a roller 42 pivoted thereon. The forward edge of the collar 31 may bear against the roller to cause the carriage to travel forward with the pipe 20.

In a given pipe manufacturing machine, the height of the center of the pipe varies in accordance with the diameter of the pipe it manufactures. Therefore, means are provided for elevating and lowering the center about which the blowpipe 18 rotates. The saddle 9 upon which the gear 12 carrying the blowpipe 18 rotates is raised and lowered by a manually operated shaft 43 hung in bearing brackets 44 on each of the forward carriage standards 6. A worm wheel 45 is fixed to each end of the shaft 43. Each wheel 45 meshes with a worm gear 46 mounted in a bearing on a bracket 47 on each of the forward standards 6. Each shaft 48 to which the worm gears 46 are fixed carries a pinion 49. The pinion 49 is fixed to the shaft 48 and it meshes with a rack 50 projecting through a slot 51 in the standards 6. The racks 50 are fixed to and extend parallel to the forward posts 7 which carry the saddle 9 and the ring gear 12 carrying the cutting blowpipe 18. A handle may be applied to one end of the manually operable shaft 43 and by the operation of which the center of rotation of the blowpipe may be raised or lowered through the operation of the mechanism just described. After the saddle 9 has been adjusted so that pipe 20 is centered in the ring gear 12, the forward supports 7 are clamped in the standards 6 by tightening the stud bolts 52 which pass through a lug 53 on each forward standard and is threaded into a second lug 54 on the opposite side of the slot 51 from the first lug 53. The rear posts 7 may be clamped in the rear standards 6 by the set screw 55 in each of the rear standards.

It will be noted that the weight of the vertically adjustable portion of the carriage is substantially balanced over the two forward posts 7 so that the rear posts 7 act principally as guides and do not bind in the hollow standards 6 as they are being raised and lowered.

In the operation of our cutting machine the carriage 1 is moved to the rear end of the track 2. Then as the pipe is discharging from the pipe manufacturing machine (not shown) the collar 31 is clamped to the pipe 20 so that when it contacts with the roller 42 on the carriage 1, the blowpipe 18 will be in position to cut off the desired length of pipe as the cutting machine is moved forwardly along the track 2 by the thrust of the collar 31 against the roller 42. The preheating flames of the blowpipe may be turned on prior to or during the forward movement of the cutting machine. After the preheating flames have been turned on and the carriage begins to advance with the pipe, the change speed mechanism 28 having been set for the proper rotative speed, the motor and the cutting oxygen are turned on simultaneously. As the carriage advances, the blowpipe continues to travel around the pipe until the pipe is cut off squarely. The collar 31 is then unclamped from the pipe 20 and is slid backward along the pipe as the carriage 1 is moved to the rear end of the track 2 in readiness for the next cut.

While the pipe is described as rotating in the direction A, the blowpipe may be rotated in the same direction or in the opposite direction. In either event the speed of rotation of the blowpipe 18 may be adjusted by the lever 30 so that the algebraic sum of the speed of the blowpipe and the pipe 20 will be equal to the proper cutting speed required to produce a clean cut.

While we have shown only a single embodiment of our invention as applied to a pipe cutting machine, our machine may be used for cutting other metal shapes and also may be employed for welding transverse and longitudinal seams in metal by substituting a welding blowpipe for the cutting blowpipe described herein. Other changes and modifications and uses may be made without departing from the scope of our invention as defined in the appended claims.

We claim:

1. A machine for cutting off sections of an advancing shape of metal comprising in combination a blowpipe; means for supporting said blowpipe independentaly of said shape, a means for advancing said blowpipe in the direction of and at the same rate of advancement as the shape, and means for moving said blowpipe along a path transverse to the direction of advancement of the shape.

2. A machine for cutting off sections of an advancing shape of metal comprising a track parallel to the advancing movement of said shape, a carriage supported on said track, means adapted to be attached to said shape and to contact with said carriage to cause said carriage to travel with said shape along said track, a blowpipe mounted on said carriage, means for traversing said blowpipe across the path of the advancing movement of said shape, and means for raising and lowering the height of said carriage.

3. In a machine for transversely cutting a metal shape while the same is advancing in the direction of its longitudinal axis, the combination of a blowpipe and a mechanism comprising a means for supporting said blowpipe independently of and in operative relation to said shape, means coacting with said shape for moving said blowpipe supporting means parallel to said axis and means for moving said blowpipe at a uniform rate in a plane intersecting said axis.

4. In a machine for transversely cutting or welding a metal shape while the same is advancing in the direction of its longitudinal axis, the combination of a blowpipe, a rotatable mounting for said blowpipe supported independently of and in operative relation to said shape, means coacting with said shape whereby said mounting is advanced in a direction parallel to said axis, and means whereby said mounting is simultaneously rotated about said axis.

5. In a machine for transversely cutting or welding a metal shape while the same is advancing in the direction of its longitudinal axis, the combination of a cutting or welding means, a rotatable mounting for said means supported independently of and in operative relation to said shape, means coacting with said shape whereby said mounting is advanced in a direction parallel to said axis, and means whereby said mounting is rotated about said axis.

6. In a machine for transversely cutting or welding a metal shape while the same is advancing in the direction of its longitudinal axis, the combination of a blowpipe, a movable support for said blowpipe, a rotatable mounting for said blowpipe carried on said support in operative relation to said shape, means whereby said support is advanced in a direction parallel to said axis, and means for adjusting the center of rotation of said mounting toward and away from said axis.

7. A machine for cutting pipe while the pipe is moving longitudinally and is rotating about its longitudinal axis, comprising a cutting means, a means for supporting said cutting means independently of said pipe, means coacting with said pipe for moving said cutting means in the direction of and at the same rate of speed as the longitudinal movement of the pipe, means for rotating said cutting means about the longitudinal axis of the pipe, and means for varying the rotative speed of the cutting means in respect to the rotative speed of the pipe.

8. A pipe cutting machine comprising a track, a carriage supported on said track, means adapted to be attached to the pipe to cause said carriage to move along said track with the longitudinal movement of the pipe, a blowpipe mounted on the carriage adapted to rotate about the pipe, and a motor on said carriage adapted to rotate the blowpipe.

9. A pipe cutting machine comprising a track, a carriage supported on said track and through which a rotating pipe may pass longitudinally and parallel to said track, a collar adapted to be secured to the pipe and to rotate therewith and against said carriage to cause said carriage to travel on said track, a blowpipe rotatably mounted on said carriage, and a motor geared to said blowpipe for rotating said blowpipe about the pipe.

10. A machine for cutting a longitudinally moving and rotating pipe, comprising a track, a carriage supported on said track, a cutting blowpipe mounted on said carriage, a roller mounted on said carriage, and a collar adapted to be secured to the pipe to rotate therewith and against the circumference of said roller.

11. A machine for cutting a longitudinally moving and rotating pipe, comprising a track, a carriage supported on said track, a cutting blowpipe rotatably mounted on said carriage, a roller mounted on said carriage, a collar adapted to be attached to the pipe and to thrust against the circumference of said roller; a motor; a change speed mechanism driven by said motor and geared to said rotatable blowpipe mounting for rotating said blowpipe about the pipe.

12. A pipe cutting machine comprising a track, a carriage supported on said track and through which a rotating pipe may pass longitudinally and parallel to said track, means adapted to be attached to the pipe and to contact with said carriage to cause said carriage to travel with the pipe along said track, an annular gear through which the pipe may pass rotatably mounted on said carriage, a motor geared to said annular gear, a blowpipe mounted on said gear, and means of adjusting the nozzle of said blowpipe inwardly and outwardly from the center of the gear.

13. A pipe cutting machine comprising a track, a carriage supported on said track and through which a rotating pipe may pass longitudinally and parallel to said track, means adapted to be attached to the pipe and to contact with said carriage to cause said carriage to travel with the pipe along said track, an annular gear through which the pipe may pass rotatably mounted on said carriage, a motor geared to said annular gear, a blowpipe mounted on said gear, and means for raising and lowering the center of said annular gear with respect to said track.

14. A metal cutting machine comprising a vertically adjustable frame, a forward and a rear support for said frame, a hollow annular bearing on the front end of said frame extending forwardly beyond said forward support, a ring gear journaled on said bearing, a blowpipe secured to said ring gear and extending forwardly therefrom, a motor and a driving mechanism geared to said gear and secured to said frame adjacent to said ring gear rearwardly of said ring gear, and means cooperating with said forward supports for raising and lowering said frame.

15. Method of transversely cutting a metal shape while the same is advancing in the direction of its longitudinal axis, comprising moving a metal cutting blowpipe parallel to and in operative relation to and at the same rate of advancement as the shape and simultaneously moving said blowpipe in a plane intersecting said axis.

In testimony whereof, we affix our signatures.

GEORGE I. JONES.
JAMES H. BUCKNAM.